(12) United States Patent
Singh et al.

(10) Patent No.: US 7,505,407 B2
(45) Date of Patent: Mar. 17, 2009

(54) ADAPTABLE TRAFFIC CONTROL FOR VARIABLE PORT SPEED CONNECTIVITY DEVICE

(75) Inventors: Hartej Singh, Folsom, CA (US); Muraleedhara H. Navada, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 10/813,958

(22) Filed: Mar. 31, 2004

(65) Prior Publication Data

US 2005/0220013 A1    Oct. 6, 2005

(51) Int. Cl.
*H04L 1/00* (2006.01)
*H04L 12/28* (2006.01)

(52) U.S. Cl. .................. 370/231; 370/229; 370/230; 370/230.1; 370/232; 370/233; 370/234; 370/252; 370/253; 370/254; 370/255; 370/256; 709/201; 709/234

(58) Field of Classification Search .............. None
See application file for complete search history.

(56) References Cited

U.S. PATENT DOCUMENTS 5,991,271 A * 11/1999 Jones et al. ............... 370/252
2004/0177087 A1 * 9/2004 Wu et al. .................. 707/102

* cited by examiner

*Primary Examiner*—William Trost, IV
*Assistant Examiner*—Raj Jain
(74) *Attorney, Agent, or Firm*—Blakely, Sokoloff, Taylor & Zafman LLP

(57) ABSTRACT

According to embodiments of the present invention, an adaptable traffic control system, method, article of manufacture, and apparatus receive a user-programmed value representing an amount of target traffic allowed through a connectivity device port and a user-programmed value representing a time interval during which to receive the allowed amount of target traffic. The two values define a percentage of target traffic allowed through the port for a particular port speed. One embodiment determines that port speed changed by a factor of N, scales the time interval by a factor of 1/N, and based on the allowed amount of target traffic and the scaled time interval, drops incoming target traffic when the received percentage of incoming target traffic is equal to (or greater than) the defined percentage of target traffic allowed through the port.

18 Claims, 3 Drawing Sheets

ADAPTABLE TRAFFIC CONTROL FOR VARIABLE PORT SPEED CONNECTIVITY DEVICE

BACKGROUND

1. Field

Embodiments of the present invention relate to networks and, in particular, to traffic control in networks.

2. Discussion of Related Art

Networks enable computers and other devices to communicate with each other. Devices commonly communicate with each other by passing packets of information among themselves. A packet typically includes a payload and a header. The header usually includes the address of the destination device and the payload includes the information (data, video, audio, etc.) for the device.

When a packet arrives at an input port on a connectivity device, such as a switch, a router, a bridge, etc., the connectivity device looks in one or more look-up tables to determine, based on the address in the packet, the destination device (e.g., printer, computer, application) and which output port the packet should exit to reach the destination device. Sometimes a packet indicates that it is intended for all destinations (e.g., broadcast packet). If the packet is to be broadcast, the connectivity device sends the packet to the all output ports. Sometimes a packet indicates that it is intended for several but not all destinations (e.g., multicast packet). If the packet is to be multicast, the connectivity device sends the packet to the designated output ports. Sometimes a packet arrives at an input port that has an address that is not in the connectivity device's look-up table (e.g., "destination unknown" packet). In this situation, the connectivity device sends the packet to all of its output ports (i.e., broadcasts the packet).

Sometimes there is a sudden increase in the number of packets (i.e., traffic) in a network. Such a sudden increase may be called a "storm," and storm traffic often consists of destination unknown, multicast, and/or broadcast packets. When storms occur, destination unknown, multicast, and/or broadcast packets tend to multiply at each node in the network and their effect on the network can increase exponentially to the point of causing congestion. As a result, overall network performance may be degraded and devices may slow or even stop working altogether. Other useful packets get dropped because the network is not able to handle the congestion. A balance must be struck, therefore, so that a connectivity device can allow some storm traffic but not to the significant detriment of other useful packets.

A common mechanism to resolve a storm is to allow only a percentage of all incoming traffic to be storm traffic based on the port speed. To illustrate, suppose the port speed is 10 Mbps and the user programs an allowed percentage of storm traffic of ten percent. In this instance, storm traffic will be limited to 1 Mbps in each user-specified unit time interval. If the incoming storm traffic exceeds the rate of 1 Mbps within each time interval, the input port refuses to allow any more incoming storm traffic to pass. When the unit time interval has elapsed, the input port resumes allowing storm traffic until the allowed percentage of traffic bandwidth is again exceeded within the unit time interval.

Many connectivity devices can operate at several different speeds and the speed is determined by the speed of the link to which the connectivity device is attached. Thus, when upstream/downstream link speed is 10 Mbps the connectivity device port that is attached to the link operates at 10 Mbps. When the incoming link speed changes to 100 Mbps the connectivity device port speed also changes to 100 Mbps.

In the context of storm control, a uniform port speed is assumed when specifying the percentage of storm traffic that is to be allowed per unit time interval. Therefore, if the input port on the connectivity device changes speed in response to a change in link speed, for example, as is the case with variable speed connectivity devices, the original traffic parameters are no longer accurate. The actual percentage storm traffic allowed through the connectivity device is not the same as the allowed percentage programmed by the user. For example, when the connectivity device port speed changes to 100 Mbps, the connectivity device still allows a traffic rate of only 1 Mbps in each unit time interval, even though the 1 Mbps rate of storm traffic is only one percent of 100 Mbps rather than the ten percent programmed by the user.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
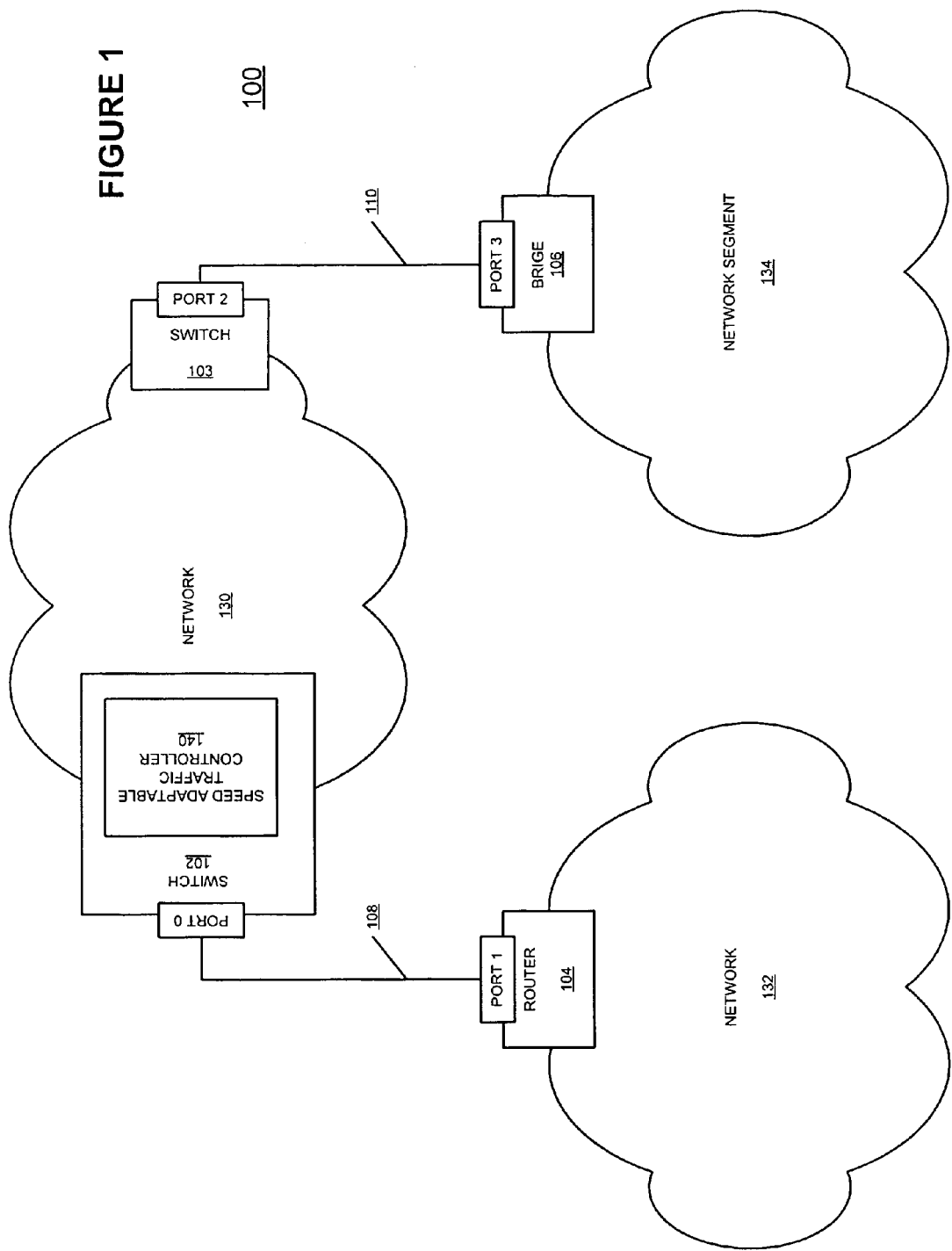
FIG. 1 is a high-level block diagram of a network according to an embodiment of the present invention.

FIG. 1 is a high-level block diagram of a network 100 according to an embodiment of the present invention. The network 100 includes a switch 102 coupled to a router 104 and a switch 103 coupled to a bridge 106. Port 0 on the switch 102 is coupled to port 1 on the router 104 via a link 108. Port 2 on the switch 103 is coupled to port 3 on the bridge 106 via a link 110.

In the illustrated embodiment, the switches 102 and 103 are part of a network 130, the router 104 is part of a network 132, and the bridge 106 is part of a network segment 134. The network segment 134 can be part of the network 130. Traffic flows between the network 130 and the network 132 via the link 108. Traffic flows between the network 130 and the network segment 134 via the link 110.

In one embodiment, the network 130 can be a local area network (LAN), which is typically thought of as being limited to a specific geographic area, such as within a building or a campus. Workgroups within the network 130 often share the same resources, such as printers and applications.

In other embodiments, the network 132 and/or the network segment 134 can be a metropolitan area network (MAN). A MAN commonly includes two or more LANs networked together in a physical space roughly equivalent to a metropolitan area. A typical MAN is a high-performance public network.

The network 100 can be a wide area network (WAN), which spans a large geographic area. An example of a WAN is the Internet. A private network also can be a WAN. For example, many companies have a corporate WAN that connects its many offices around the world. Each office may be a LAN and the WAN connects the LANs to each other.

The switches 102 and 103 can perform their conventional functions of choosing a path across which to send traffic to its destination. The switches 102 and 103 can forward a packet to a given destination before the entire packet has been received or can wait until the entire packet is received before forwarding to the destination. The switches 102 and can filter traffic, manage allocation of bandwidth for quality of service (QoS) implementations, perform load balancing, and/or select the best route to a given destination from among several paths. The switches 102 and 103 can be an Ethernet switch.

The router 104 can perform its conventional functions of connecting separate networks together, filtering traffic, and/or selecting the best route to a given destination from among several paths. The router 104 can use the logical network address of the destination to implement its functions.

The bridge 106 can perform its conventional functions of connecting network segments, filtering traffic, and forwarding traffic to a given destination. The 106 can use the physical hardware address of the destination.

The links 108 and/or 110 can be coaxial cables (e.g., thick coaxial cable (RG-8, RG-11), thin coaxial cable (RG-58, RG-62)). The links 108 and/or 110 can be twisted pair cables (e.g., UTP twisted pair cable, STP twisted pair cable). The links 108 and/or 110 can be fiber optic cables (e.g., single mode, multimode). Of course, embodiments of the present invention are not so limited and after reading the description herein a person of ordinary skill in the relevant art will readily recognize how to implement the links 108 and 110 using a variety of media (e.g., wireless media such as infrared, radio frequency (RF), laser).

In embodiments of the present invention, the switch 102 is a variable speed switch. For example, the switch 102 can operate at 1 Mbps, 10 Mbps, 1 Gbps, or other suitable speed. The switch 102 also can change speeds when the speed of the link 108, for example, changes.

Figure 2:
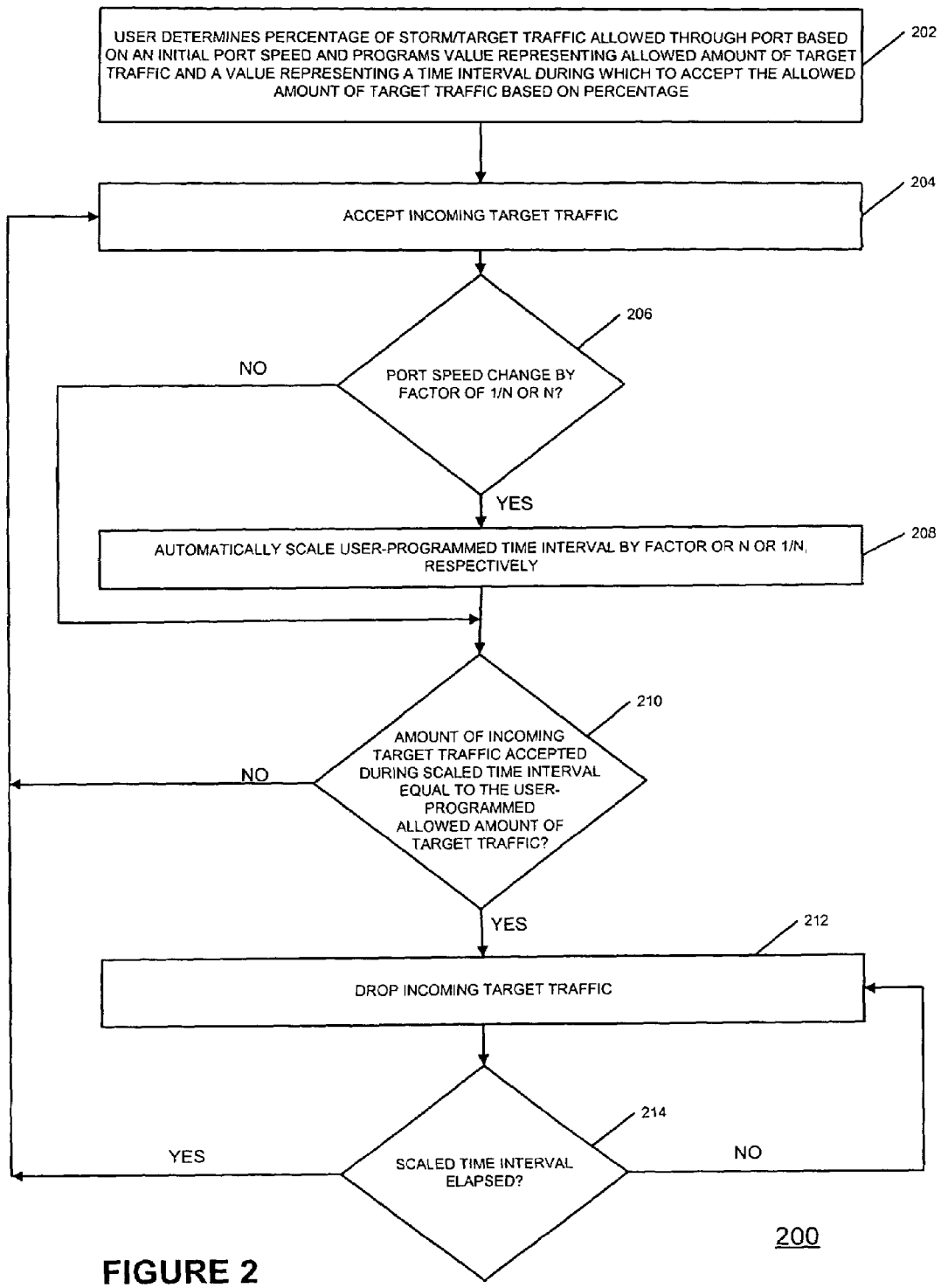
FIG. 2 is a flowchart illustrating an approach to implementing the speed adaptable traffic controller depicted in FIG. 1 according to an embodiment of the present invention.

In one embodiment, the switch 102 can control traffic on its ports using a speed adaptable traffic controller 140. FIG. 2 is a flowchart illustrating a process 200 implemented by the controller 140 according to an embodiment of the present invention. The operations of the process 200 are described as multiple discrete blocks performed in turn in a manner that is most helpful in understanding embodiments of the invention. However, the order in which they are described should not be construed to imply that these operations are necessarily order dependent or that the operations be performed in the order in which the blocks are presented.

Of course, the process 200 is only an example process and other processes may be used to implement embodiments of the present invention. A machine-accessible medium with machine-readable instructions thereon may be used to cause a machine (e.g., a processor) to perform the process 200.

In a block 202, a user determines a percentage of storm traffic or other target traffic to be allowed through a particular port based on an initial port speed. The user also programs a value representing an allowed amount of target traffic based on the percentage of target traffic allowed and a value representing the time interval. In one embodiment, each user-programmed value is stored in a register.

For purposes of illustration, suppose that a user determines that ten percent of target traffic is to be allowed through port 0 and that the initial speed of port 0 is 10 Mbps. The user-programmed value for the allowed amount of target traffic is thus 1 Mb and the user-programmed value for the time interval is one second (i.e., 1 Mbps is ten percent of 10 Mbps).

In a block 204, the controller 140 accepts incoming traffic including target traffic.

In a block 206, if traffic control is enabled, the controller 140 determines whether the port speed has changed (e.g., by a factor of 1/N or N).

If the port speed has changed, then the process 200 passes to a block 208 in which the controller 140 automatically scales the value representing the user-programmed time interval according to the type of change. For purposes of illustration, suppose in one embodiment that the controller 140 has determined that port speed has changed from 10 Mbps to 1 Mbps (e.g., by a factor of 1/N, where N=10).

In this embodiment, because the port speed changed by a factor of 1/N, the controller 140 scales the value representing the time interval by a factor of N to ten times one second or ten seconds. The user-programmed value of 10 Mb stored in the register is not changed and the user-programmed value of one second stored in the register is not changed. Scaling circuitry in the controller 140 (described below with reference to FIG. 3) scales the time interval by $1/10$ keeps the percentage of allowed target traffic at ten percent (i.e., 1 Mb per 10 seconds=0.1 Mbps or ten percent of 1 Mbps).

Suppose in an alternative embodiment that the controller 140 has determined that port speed has changed from 10 Mbps to 100 Mbps (e.g., by a factor of N, where N=10). In this embodiment, because the port speed changed by a factor of 10, the controller 140 scales the value representing the time interval by a factor of $1/10$ to 0.1 seconds. The user-programmed value of 10 Mb stored in the register is not changed and the user-programmed value of one second stored in the register is not changed, but scaling the time interval by 10 keeps the percentage of allowed target traffic at ten percent (i.e., 1 Mb per 0.1 seconds=10 Mbps or ten percent of 100 Mbps).

In a block 210, the controller 140 determines whether the amount of incoming target traffic accepted during the scaled time interval is equal to (or greater than) the user-programmed allowed amount of target traffic. If the controller 140 determines that the amount of incoming target traffic accepted during the scaled time interval is less than the user-programmed allowed amount of target traffic, then the process 200 returns to the block 204, wherein the controller 140 continues to accept incoming target traffic.

If the controller 140 determines that the amount of incoming target traffic accepted during the scaled time interval is equal to (or greater than) the user-programmed allowed amount of target traffic, then the process 200 passes to the block 212, in which the controller 140 drops (i.e., stops accepting) incoming target traffic.

In a block 214, the controller determines whether the scaled time interval has elapsed. If the controller 140 determines that the scaled time interval has not elapsed, then the process 200 returns to the block 212, wherein the controller 140 continues to drop incoming target traffic.

If the controller 140 determines that the scaled time interval has elapsed, then the process 200 returns to the block 204, wherein the controller 140 resumes accepting incoming target traffic.

If, on the other hand the port speed has not changed, as determined in the block 206, then the process 200 passes to the block 210 in which the process 200 determines whether the amount of incoming target traffic accepted during the scaled time interval is equal to (or greater than) the user-programmed allowed amount of target traffic.

As described above when the port speed changes, the user-programmed values do not change from those initially programmed, yet the percentage of allowed target traffic remains as initially programmed despite the change in port speed. The user does not have to reprogram the value for the allowed amount of target traffic or the value for the time interval during which to receive the allowed amount of target traffic. Nor does the system software have to generate an interrupt to cause these parameters to be reprogrammed. The controller 140 automatically scales the time interval to ensure that the percentage represented by the user-programmed values remains the same.

In one embodiment of the present invention, storm traffic includes broadcast packets, multicast packets, and/or destination unknown packets.

Figure 3:
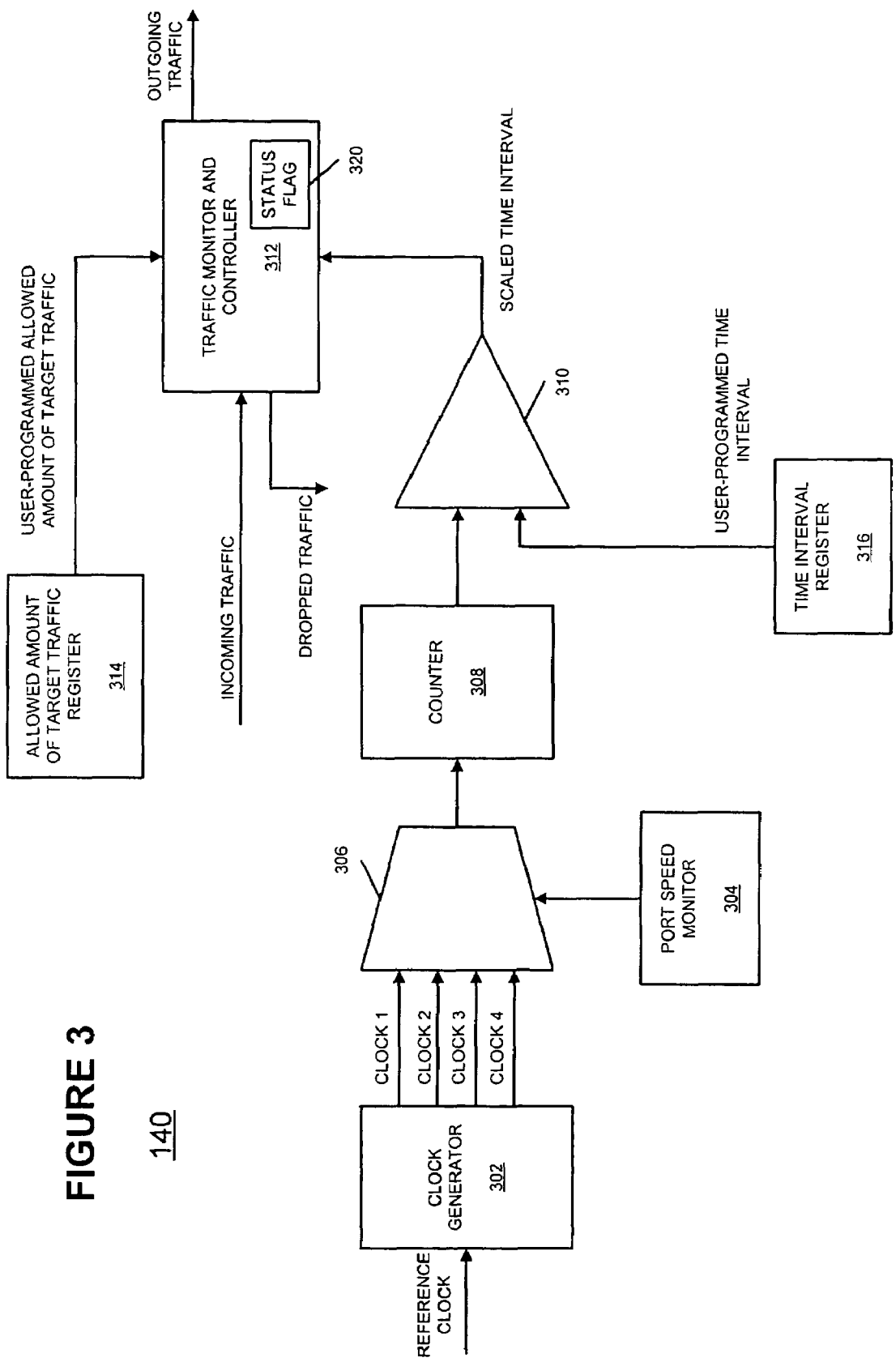
FIG. 3 is a schematic diagram showing the speed adaptable traffic controller depicted in FIG. 1 in more detail according to an embodiment of the present invention.

FIG. 3 is a schematic diagram showing the controller 140 in more detail according to an embodiment of the present invention. The illustrated controller 140 includes a clock generator 302 and a port speed monitor 304, both of which are coupled to a selector 306. The output of the selector 306 is coupled to a counter 308. The counter 308 is coupled to a comparator 310. The output of the comparator 310, which is the scaled time interval, is coupled to a traffic monitor and controller 312.

The controller 140 also includes at least one allowed amount of target traffic register 314 for storing a value representing the allowed amount of target traffic and at least one time interval register 316 for storing the time interval during which to accept the allowed amount of target incoming traffic. The allowed amount of target traffic register 314 is coupled to the traffic monitor and controller 312. The time interval register is coupled to the comparator 310.

In embodiments of the present invention, the clock generator 302 receives a reference clock and generates several clocks (clock 1, clock 2, clock 3, clock 4). The clocks can be related to multiples of the user-programmed time interval such that if, for example, the user-programmed time interval is one second, clock 1 can be 10 MHz, clock 2 can be 1 MHz, clock 3 can be 0.1 MHz, and clock 4 can be 0.01 MHz. Circuits for generating clock 1, clock 2, clock 3, and clock 4 are known and thus will not be described further herein.

In embodiments of the present invention, a media access controller (MAC) or other suitable circuitry in port 0 of the switch 102 performs peer-to-peer auto-negotiation with the MAC or other or corresponding circuitry in port 1 of the router. The port speed monitor 304, which is typically part of the MAC, also provides information about the port speed to the selector 306.

In embodiments of the present invention, the selector 306 uses the output of the port speed monitor 304 to select one of the clocks to be coupled to the counter 308. The selected clock increments the counter 308.

In embodiments of the invention, the counter 308 is reset at the end of each unit time interval can be preset to count up to a value representing the user-programmed time interval.

The comparator 310 compares the output of the counter 308 with the user-programmed time interval. When the output of the counter 308 is equal to the user-programmed time interval, the comparator 310 outputs a signal denoting the end of the scaled time interval (e.g., the comparator 310 trips). This signal indicating the end of the time interval is provided to the traffic monitor and controller 312 along with the user-programmed allowed amount of target traffic. This signal also is used to reset the counter 308 as well as the traffic counter (not shown) in the traffic monitor and controller 312.

For purposes of illustration suppose again that the initial port speed is set to 10 Mbps and the percentage of target traffic to be allowed is ten percent. The user-programmed value in the register 314 will be 1 Mb and the user-programmed value in the register 316 will be one second. The port speed monitor 304 informs the selector 306 that the port speed is 10 Mbps and the selector 306 couples the 1 MHz clock 2 to the counter 308. Initially, the counter 308 is in reset state.

The traffic monitor and controller 312 accepts incoming traffic and the 1 Mhz clock 2 increments the counter 308. The traffic monitor and controller 312 compares the amount of incoming target traffic to the user-programmed allowed amount of target traffic (i.e., 1 Mb) and stops accepting incoming target traffic if the amount of target traffic has reached the user-programmed allowed amount of target traffic.

In one embodiment of the present invention, the traffic monitor and controller 312 includes a status flag 320, which this is used to decide whether target traffic can be permitted or not. If the status flag 320 is set, then no target traffic is allowed. Conversely, if the status flag 320 is not set, then target traffic is allowed. The status flag 320 can be automatically reset at the end of each time interval.

The traffic monitor and controller 312 continues to refuse incoming traffic until the counter 308 reaches a count of ten (i.e., one second), at which time the comparator 310 trips. When the comparator 310 trips, the traffic monitor and controller 312 resets and resumes accepting incoming target traffic. In one embodiment of the present invention, the counter 308 and the status flag 320 are reset.

Alternatively, suppose further that the port speed monitor 304 then informs the selector 306 that the port speed is 1 Mbps. In this embodiment, the selector 306 couples the 0.1 MHz clock 3 to the counter 308. The traffic monitor and controller 312 accepts incoming traffic and the 0.1 Mhz clock 3 increments the counter 308. The traffic monitor and controller 312 compares the amount of incoming target traffic to the user-programmed allowed amount of target traffic (i.e., 1 Mb) and stops accepting incoming target traffic if the amount of target traffic has reached the user-programmed allowed amount of target traffic.

The traffic monitor and controller 312 continues to refuse incoming traffic until the counter 308 reaches a count of ten at which time the comparator 310 trips. Note that in this embodiment, the counter 308 will count up to ten at a speed that is ten times slower than when the 1 MHz clock 2 was applied and the comparator 310 will trip at ten seconds rather than at one second. Thus the traffic monitor and controller 312 permits 1 Mb in ten seconds, which is ten percent of 1 Mbps. When the comparator 310 trips, the traffic monitor and controller 312 resets and resumes accepting incoming target traffic.

Suppose in the alternative that the port speed monitor 304 informs the selector 306 that the port speed is 100 Mbps. In this embodiment, the selector 306 couples the 10 MHz clock 1 to the counter 308. The traffic monitor and controller 312 accepts incoming traffic and the 10 Mhz clock 1 increments the counter 308. The traffic monitor and controller 312 compares the amount of incoming target traffic to the user-programmed allowed amount of target traffic (i.e., 1 Mb) and stops accepting incoming target traffic if the amount of target traffic has reached the user-programmed allowed amount of target traffic.

The traffic monitor and controller 312 continues to refuse incoming traffic until the counter 308 reaches a count of ten at which time the comparator 310 trips. Note that in this embodiment, the counter 308 will count up to ten at a speed that is ten times faster than when the 1 MHz clock 2 was applied and the comparator 310 will trip at 0.1 seconds rather than at one second. Thus the traffic monitor and controller 312 permits 1 Mb in 0.1 seconds, which is ten percent of 100 Mbps. When the comparator 310 trips, the traffic monitor and controller 312 resets and resumes accepting incoming target traffic.

Although embodiments of the present invention are described with respect to bits per second, after reading the description herein a person of ordinary skill in the relevant art will readily recognize how to implement embodiments using bytes per second, packets, or other units of information and/or time.

Although embodiments of the present invention are described with respect to changing port speed by a factors of ten, any multiples of the time interval can be used. After reading the description herein a person of ordinary skill in the relevant art will readily recognize how to implement embodiments other time interval multipliers.

Although embodiments of the present invention are described with respect to packet-switched networks, embodiments of the present invention are not so limited. For example, embodiments of the present invention can be implemented in circuit-switched networks. After reading the description herein a person of ordinary skill in the relevant art will readily recognize how to implement embodiments in circuit-switched networks.

Embodiments of the present invention may be implemented using hardware, software, or a combination thereof. In implementations using software, the software may be stored on a machine-accessible medium.

A machine-accessible medium includes any mechanism that provides (i.e., stores) information in a form accessible by a machine (e.g., a computer, network device, personal digital assistant, manufacturing tool, any device with a set of one or more processors, etc.). For example, a machine-accessible medium includes recordable and non-recordable media (e.g., read only memory (ROM), random access memory (RAM), magnetic disk storage media, optical storage media, flash memory devices, etc.).

In the above description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. A method, comprising:
   receiving an allowed amount of target traffic representing a first value and a second value representing a time interval during which to receive the allowed amount of target traffic, the first value and the second value defining a percentage of target traffic allowed through a port, the port having a port speed;
   determining that port speed changed by a factor of N;
   scaling the second value by a factor of 1/N, respectively;
   based on the allowed amount of target traffic and the scaled second value, dropping target traffic when a percentage of target traffic exceeds a defined percentage of target traffic allowed through the port;
   selecting a clock from a set of clocks based on determining that port speed changed;
   receiving the selected clock and incrementing a counter using the selected clock comparing an output of the counter to the second value; and
   when the counter output is equal to the second value generating the scaled second value.

2. The method of claim 1, further comprising receiving an indication that port speed changed from a media access controller (MAC).

3. The method of claim 1, further comprising:
   comparing an amount of target traffic to the allowed amount of target traffic; and
   causing a status flag to be set when the amount of target traffic and the allowed amount of target traffic are equal.

4. The method of claim 3, further comprising dropping target traffic until the time interval represented by the scaled second value has elapsed.

5. The method of claim 4, further comprising permitting target traffic through the port after the time interval represented by the scaled second value has elapsed.

6. The method of claim 1, further comprising receiving the first value representing an allowed amount of broadcast, multicast, or destination unknown traffic.

7. An apparatus, comprising:
   logic to receive an allowed amount of target traffic representing a first value and a second value representing a time interval during which to receive the allowed amount of target traffic, the first value and the second value defining a percentage of target traffic allowed through a port, the port having a port speed, the logic further to:
   determine that port speed changed by a factor of N,
   scale the second value by a factor of 1/N, respectively, and
   based on the allowed amount of target traffic and the scaled second value, to drop target traffic when a percentage of target traffic exceeds a defined percentage of target traffic allowed through the port;
   a controller to receive an indication that port speed changed;
   a selector to select a clock from a set of clocks based on the indication that port speed changed;
   a counter to receive the selected clock and to increment at a clock rate; and
   a comparator to compare an output from the counter to the second value, and when the counter output is equal to the second value, to generate the scaled second value.

8. The apparatus of claim 7, wherein the logic is further to:
   compare an amount of target traffic to the allowed amount of target traffic; and
   cause a status flag to be set when the amount of target traffic and the allowed amount of target traffic are equal.

9. The apparatus of claim 8, wherein the controller is further to cause the status flag to be reset after the time interval represented by the scaled second value has elapsed.

10. The apparatus of claim 9, wherein the controller is further to permit target traffic through the port after the status flag is reset.

11. The apparatus of claim 7, wherein the first value represents an allowed amount of broadcast, multicast, or destination unknown traffic.

12. A system, comprising:

logic to receive an allowed amount of target traffic representing a first value and a second value representing a time interval during which to receive the allowed amount of target traffic, the first value and the second value defining a percentage of target traffic allowed through a port, the port having a port speed, the logic further to determine that port speed changed by a factor of N, to scale the second value by a factor of 1/N, respectively, and based on the allowed amount of target traffic and the scaled second value, to drop target traffic when a percentage of target traffic exceeds the defined percentage of target traffic allowed through the port, a controller to receive an indication that port speed changed, a selector to select a clock from a set of clocks based on the indication that port speed changed, a counter to receive the selected clock and to increment at a clock rate, and a comparator to compare an output from the counter to the second value, and when the counter output is equal to the second value, to generate the scaled second value; and a twisted pair cable to couple target traffic to the port.

13. The system of claim 12, wherein the twisted pair cable is a UTP twisted pair cable.

14. The system of claim 12, wherein the twisted pair cable is a STP twisted pair cable.

15. An article of manufacture, comprising:

a computer readable medium encoded with computer executable instructions that when accessed by a computer, cause the computer to perform the operations comprising:

receiving an allowed amount of target traffic representing a first value and a second value representing a time interval during which to receive the allowed amount of target traffic, the first value and the second value defining a percentage of target traffic allowed through a port, the port having a port speed;

determining that port speed changed by a factor of N;

selecting a clock from a set of clocks based on determining that port speed changed;

receiving the selected clock and incrementing a counter using the selected clock;

comparing an output of the counter to the second value;

when the counter output is equal to the second value generating a scaled second value by scaling the second value by a factor of 1/N, respectively; and based on the allowed amount of target traffic and the scaled second value, dropping target traffic when a percentage of target traffic exceeds the defined percentage of target traffic allowed through the port.

16. The article of manufacture of claim 15, wherein the computer readable medium is further encoded with computer executable instructions that cause the machine to perform operations comprising:

comparing an amount of target traffic to the allowed amount of target traffic; and causing a status flag to be set when the amount of target traffic and the allowed amount of target traffic are equal.

17. The article of manufacture of claim 16, wherein the computer readable medium is further encoded with computer executable instructions that cause the machine to perform operations comprising dropping target traffic until the time interval represented by the scaled second value has elapsed.

18. The article of manufacture of claim 17, wherein the computer readable medium is further encoded with computer executable instructions that cause the machine to perform operations comprising permitting target traffic through the port when the time interval represented by the scaled second value has elapsed.

* * * * *